United States Patent
Mikami et al.

(10) Patent No.: US 9,371,915 B2
(45) Date of Patent: Jun. 21, 2016

(54) POPPET VALVE WITH A FORMED SEAT, AND METHOD OF MAKING

(71) Applicant: NITTAN VALVE CO., LTD., Kanagawa (JP)

(72) Inventors: Maiku Mikami, Kanagawa (JP); Kazunori Kurahashi, Kanagawa (JP)

(73) Assignee: NITTAN VALVE CO., LTD., Kanagawa (JP)

( * ) Notice: Subject to any disclaimer, the term of this patent is extended or adjusted under 35 U.S.C. 154(b) by 0 days.

(21) Appl. No.: 14/788,086

(22) Filed: Jun. 30, 2015

(65) Prior Publication Data

US 2015/0300506 A1  Oct. 22, 2015

Related U.S. Application Data

(60) Division of application No. 14/208,822, filed on Mar. 13, 2014, now Pat. No. 9,163,734, which is a continuation-in-part of application No. PCT/JP2012/065231, filed on Jun. 14, 2012.

(51) Int. Cl.
*F16K 1/42* (2006.01)
*B21K 1/22* (2006.01)
(Continued)

(52) U.S. Cl.
CPC ... *F16K 1/42* (2013.01); *B21K 1/22* (2013.01); *B23P 15/002* (2013.01); *F01L 3/00* (2013.01); *F01L 3/04* (2013.01); *F01L 2103/00* (2013.01);
(Continued)

(58) Field of Classification Search
CPC ............... F16K 1/42; F01L 3/00; F01L 3/04; F01L 2103/00; F01L 1/14; B23P 15/002; B21K 1/22; Y10T 137/0497; Y10T 137/0491

USPC ............... 251/318, 368, 333; 137/15.18; 29/888.4, 888.43, 888.46; 123/188.3
See application file for complete search history.

(56) References Cited

U.S. PATENT DOCUMENTS 3,987,529 A  * 10/1976  Nakagawa ............ B23K 20/08
                                                          228/107
6,193,822 B1    2/2001  Nagashima et al.
(Continued)

FOREIGN PATENT DOCUMENTS

JP    4-209914    7/1992
JP    11-22427    1/1999
(Continued)

OTHER PUBLICATIONS

International Search Report of PCT/JP2012/065231, dated Aug. 7, 2012, 4 pages total (English language translation provided.

*Primary Examiner* — John Bastianelli
(74) *Attorney, Agent, or Firm* — Hamre, Schumann, Mueller & Larson P.C.

(57) ABSTRACT

A method of forming a poppet valve having a stem, a valve head and a valve seat while concurrently maintaining compressive residual stress without grain coarsening on both the valve body and the valve seat. The method includes forming a rounded cladded part on the valve head of the poppet valve by welding and forming a valve seat surface at a predetermined aperture angle and cutting the cladded part to form a smooth surface which is subjected to uniform contact pressure at a temperature less than the recrystallization temperature of the base material or cladding material, whichever is lower, to enhance the durability of the valve seat.

2 Claims, 5 Drawing Sheets

(51) Int. Cl.
*F01L 3/04* (2006.01)
*B23P 15/00* (2006.01)
*F01L 3/00* (2006.01)

(52) U.S. Cl.
CPC ...... *Y10T 137/0491* (2015.04); *Y10T 137/0497* (2015.04)

(56) References Cited

U.S. PATENT DOCUMENTS 6,385,847 B1 * 5/2002 Larson .................. F01L 3/00 29/888.4
6,912,984 B2 * 7/2005 Narasimhan .......... B23P 15/002 123/188.3
2004/0261746 A1 * 12/2004 Narasimhan .......... B23P 15/002 123/188.3
2008/0105340 A1 * 5/2008 Huff ...................... C21D 6/004 148/607

FOREIGN PATENT DOCUMENTS

| | | |
|---|---|---|
| JP | 2000-161030 | 6/2000 |
| JP | 2004-278436 | 10/2004 |
| JP | 2011-101897 | 5/2011 |

* cited by examiner

① UPSETTING

② FORGING

③ GROOVING VALVE FACE

④ CLADDING BY WELDING

⑤ ABLATING BEFORE FORGING

⑥ SECOND FORGING

⑦ COMPLETION PROCESS

POPPET VALVE WITH A FORMED SEAT, AND METHOD OF MAKING

FIELD OF THE INVENTION

The present invention relates to a poppet valve with a formed seat and a method of forming the poppet valve wherein a cladding by welding is formed at an valve head of the poppet valve body.

BACKGROUND OF THE INVENTION

Because the valve seat of a poppet valve is subjected to repeated impacts from a valve seat in a cylinder head, technologies which enhance the durability thereof have been used as are disclosed in Patent document 1 below. That is, when manufacturing a poppet valve, a cladding by welding wear-resistant alloy is formed at a valve head thereof so as to form a valve seat.
Patent Document 1:
Japanese Patent Application Laid-Open No. 2011-101897

SUMMARY OF THE INVENTION

Although said valve seat can be hardened by the cladding material welded thereon, it is known that tensile stress remains inside of the valve seat because of the thermal stress caused by the cladding by welding, the differential thermal expansion between the cladding material and the base material, or the like. Accordingly, when tensile stress is loaded, e.g. at the time of finish processing, engine operation or the like, seat-cracking may be caused due to the resultant force of the remaining tensile stress. In particular, while the engine is running, repeated loads occur due to the consecutive opening/closing of the valve. Further, since each process of admission, compression, firing and exhaust are repeated in the cylinder, thermal stress based on the thermal cycle exists. Under such circumstances, it is inevitable that the characteristics of seat-cracking resistance are diminished. As a result, there has been a problem ensuring the resistance characteristics corresponding to the cladding material.

This invention is directed to a poppet valve having a valve seat described below, along with the method of forming it. That is, the valve seat can be work-hardened and the welding defect can be solved, while at the same time the compressive residual stress from the valve seat surface to a predetermined depth is maintained without grain coarsening in both the valve body and the valve seat.

According to one aspect of the present invention, the method of forming the valve seat of the poppet valve, which is comprised of the stem and the valve head formed at one end thereof, is characterized as follows: the method includes two steps, i.e. a step that forms a rounded cladded part on the valve head by welding and another step that forms a valve seat surface at a predetermined aperture angle; with regard to the cladded part, the surface part thereof is subjected to a cutting process so that a smooth surface is formed thereon, while at the same time, the outer circumference of the valve head is cut into a predetermined dimension; a forge process is applied to said smooth surface to form the valve seat surface; and said forge process is characterized in that uniform contact pressure is applied at a temperature range possible for cold or warm forging of the smooth surface while being less than the recrystallization temperature of the base material of the valve body or cladding material whichever is lower.

According to another aspect of the present invention, the method of forming the valve seat of the poppet valve, which is comprised of the stem and the valve head formed at one end thereof, is characterized as follows: the method includes two steps, i.e. a step that forms a rounded cladded part on the valve head by welding and another step that forms a valve seat surface at a predetermined aperture angle; with regard to the cladded part, the surface part thereof is subjected to a cutting process so that a smooth surface is formed thereon; said smooth surface is subjected to plastic working to form the valve seat surface; and said forge process is characterized in that uniform contact pressure is applied at a temperature range possible for cold or warm forging of the smooth surface while being less than the recrystallization temperature of the base material of the valve body or the cladding material, whichever is lower; a second smooth surface is formed on the region from the rounded cladded part to the inner circumference thereof in the same manner wherein the aforesaid smooth surface is formed; said second smooth surface is integrally formed with the aforesaid smooth surface to form an enlarged surface on the valve seat in the same manner that the aforesaid valve seat surface was formed; and said enlarged surface on the valve seat is formed having an aperture angle which is larger than that of the aforesaid valve seat surface.

According to yet another aspect of the present invention, the poppet valve comprised of the stem and the valve head formed at one end thereof is characterized as follows: a valve seat, wherein a rounded cladded part is formed on the valve head by welding so that a valve seat surface is formed at a predetermined aperture angle thereon; said valve seat surface is formed by way of the following steps, i.e. a cutting process of the surface part of the cladded part is performed at the same time that the outer circumference of the valve head is cut into a predetermined dimension to form a smooth surface thereon, and the smooth surface is forged by applying uniform contact pressure at a temperature range possible for cold or warm forging of the smooth surface, said temperature being less than the recrystallization temperature of the base material of the valve body or the cladding material, whichever is lower.

According to still another aspect of the present invention, the poppet valve comprised of the stem and the valve head formed at one end thereof is characterized as having a valve seat, wherein a rounded cladded part is formed on the valve head by welding so that a valve seat surface is formed at predetermined aperture angle thereon; said valve seat surface is formed by way of the following steps, i.e. ablating the surface part of the cladded part to form a smooth surface thereon and another step that plastically deforms said smooth surface; and said plastic working step is characterized in that uniform contact pressure is applied at a temperature range possible for cold or warm forging of the smooth surface while being less than the recrystallization temperature of the base material of the valve body or the cladding material, whichever is lower. A second smooth surface is formed on the region from the rounded cladded part to the inner circumference thereof in the same manner wherein the aforesaid smooth surface is formed; said second smooth surface is integrally formed with the aforesaid smooth surface to form an enlarged surface of the valve seat in the same manner that the aforesaid valve seat surface was formed; and said enlarged surface of the valve seat is formed having an aperture angle which is larger than that of the aforesaid valve seat surface.

Another aspect of the present invention allows one to form the poppet valve having the valve seat surface at a predetermined aperture angle, which is formed such that the rounded cladded part of the valve head of the poppet valve is made by way of welding so that the smooth surface is formed thereon by cutting the outer circumference of the valve head into a predetermined dimension concurrently with the cutting process, and the surface part thereof is plastically deformed. During the plastic working step, uniform contact pressure is applied at a temperature range possible for cold or warm forging of the smooth surface while being less than the recrystallization temperature of the base material of the valve body or the cladding material, whichever is lower, preventing the galling of the outer circumference from occurring. Accordingly, the valve seat can be work-hardened while at the same time maintaining compressive residual stress from the valve seat surface to a predetermined depth without grain coarsening with regard to both valve body and the valve seat. Also the welding defect can be solved. Thus characteristics of the cladding material are not impaired. Further, since said compressive stress acts as a drag on the tensile stress of the valve seat surface originating from the cutting process thereof, it becomes possible to enhance resistance characteristics of the valve seat against a fatigue breaking within the finishing process or engine operation, caused by the repeated stress while the engine is running or a seat-cracking caused by heat shock. As the valve seat is work-hardened, wear-resistance can be also enhanced.

Another aspect of the present invention allows one to form the valve seat of the poppet valve with less incidence of seat-cracking caused by the plastic working when the aperture angle of the valve seat surface is low, so that an excessive contact pressure is applied to the smooth surface at the time of plastic working, for example a poppet valve having a valve seat surface formed at an acute aperture angle of about 90-degrees or the like. This is because, at the time of forming the valve seat surface, the enlarged valve seat surface is integrally formed with the valve seat surface by forming the second smooth surface on the inner circumference of the valve seat surface so that the contact pressure applied on the valve seat surface can be reduced, resulting in the reduction of the incidence of seat-cracking on the valve seat.

Another aspect of the present invention allows one to form the poppet valve having the valve seat surface at a predetermined aperture angle, which is formed such that the valve head of the poppet valve is provided with the rounded cladded part made by way of welding so that the smooth surface is formed thereon by cutting the outer circumference of the valve head into a predetermined dimension concurrently with the cutting process, and the surface part thereof plastically deformed. In this plastic working process, uniform contact pressure is applied to the valve seat of the poppet valve at a temperature range possible for cold or warm forging of the smooth surface while being less than the recrystallization temperature of the base material of the valve body or the cladding material, whichever is lower, preventing the galling of the outer circumference from occurring. Accordingly, the valve seat can be work-hardened while concurrently maintaining compressive residual stress from the valve seat surface to a predetermined depth without grain coarsening of both the valve body and the valve seat. Also the welding defect can be solved. Thus characteristics of the cladding material are not impaired. Further, since said compressive stress acts as a drag on the tensile stress of the valve seat surface caused by the cutting process, the finishing process, or engine operation, it becomes possible to enhance the resistance characteristics against a fatigue breaking caused by repeated stress while the engine is running or a seat-cracking caused by heat shock. As the valve seat is work-hardened, wear resistance can be also enhanced.

Another embodiment of the present invention allows one to form the valve seat of the poppet valve with less incidence of seat-cracking caused by the plastic working when the aperture angle of the valve seat surface is low so as to be applied at an excessive forging contact pressure, for example with regard to a poppet valve having a valve seat surface formed at acute aperture angle of about 90-degree or the like. This is because, at the time of forming the first valve seat surface, the enlarged valve seat surface is also formed in the same manner by forming the second smooth surface on the inner circumference of the first valve seat surface at an aperture angle which is larger than that of the first valve seat surface so that the contact pressure applied on the valve seat surface can be reduced at the time of forging process.

DETAILED DESCRIPTION OF THE INVENTION

Hereinafter, aspects of this invention based on the above-described technical idea will be concretely described with reference to the drawings.

A poppet valve is comprised of a stem and a large-diameter valve head formed integrally thereto, which is manufactured by way of plastic working. Then a valve seat is formed on the valve head of the valve by a process of cladding by welding, which is eventually followed by a finishing process.

Among all manufacturing processes, the present invention has a primary feature with its valve seat forming process i.e. forming a cladding by welding an wear-resistant alloy on the valve head and then plastically deforming the valve seat. That is, it is characterized in that the valve head is provided with a groove for cladding so that the cladding by welding the wear-resistant alloy is carried out, and then the smooth surface is formed thereon through the cutting process. Subsequently uniform contact pressure is applied to the valve seat of the poppet valve at a temperature range possible for cold or warm forging of the smooth surface while being less than the recrystallization temperature of the base material of the valve body or the cladding material, whichever is lower, resulting in the formation of the valve seat surface.

Figure 1:
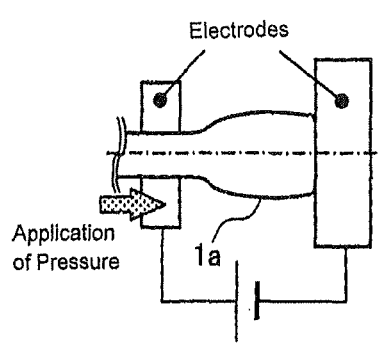
FIG. 1 is a manufacturing process diagram for making the poppet valve.
Figure 1:
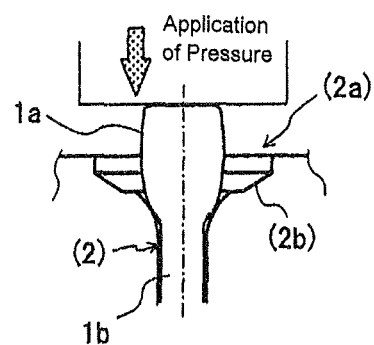
Figure 1:
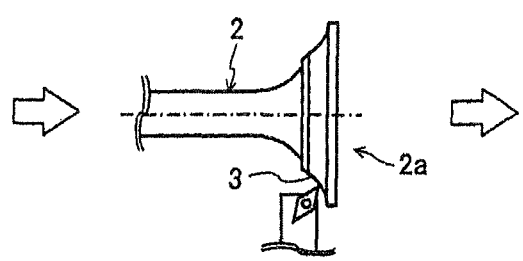
Figure 1:
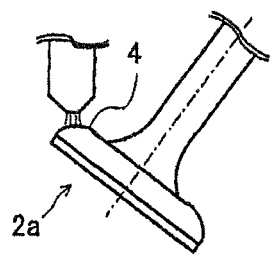
Figure 1:
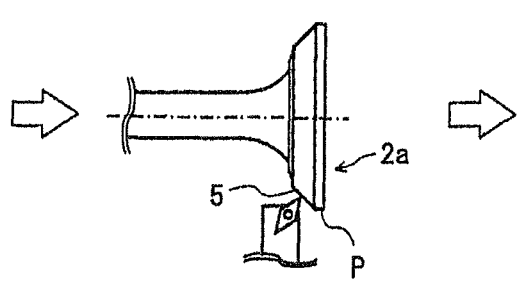
Figure 1:
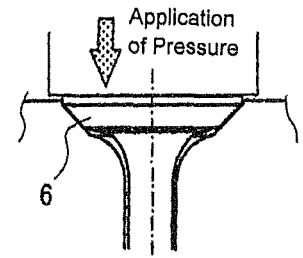
Figure 1:
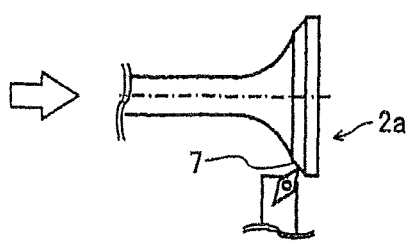

Next, the manufacturing process of the poppet valve will be concretely explained. As shown in the manufacturing process diagram of FIG. 1, a multistep process is required as follows: processing steps for forming a valve body 2 including (1) upsetting and (2) forging the valve head 2a; processing steps for forming a valve seat 2b including (3) grooving the valve head 2a, (4) cladding by welding, (5) ablating before forging and (6) second forging; and (7) a completion process to finish the poppet valve manufacturing.

Step (1) upsetting as the first process is conducted as follows: first a rod-shaped material is cut to the predetermined length where one end is subject to be round-chamfered and the other end is subject to be C-chamfered; this rod-shaped material is softened by way of a resistance heating through a potential difference between electrodes, in particular the part thereof between the electrodes; and in this state, pressure is applied in an axial direction thereof so that said one end which is round-chamfered is deformed to expand its diameter to form a valve head portion 1*a*, concurrently being preheated.

Step (2) forging as the second process is conducted as follows: first a primary forging is conducted i.e. the valve body 2 is formed by way of hot forging; this valve body 2 comprises a valve head 2*a* which is formed through flop forging of the valve head portion 1*a* to be the predetermined umbrella shape; and the outer circumference of this valve head 2*a* is provided with the valve seat 2*b* having an inclined surface at the predetermined angle.

At the third process i.e. Step (3) grooving the valve seat 2*b*, a groove 3 is provided around the valve seat 2*b* by cutting or the like so as to prevent a burn-through of the welding material at the time of the following cladding by welding.

At the fourth process i.e. Step (4) cladding by welding, a cladded part 4 is formed by cladding by welding using a wear-resistant alloy such as a cobalt system or the like along the groove 3 of the valve seat 2*b*, after preheating the valve head 2*a*. At this stage, the valve head 2*a* is cooled so that the thermal stress caused by the heat input at the time of welding can be reduced, resulting in the prevention of weld bond cracking from occurring.

Figure 2:
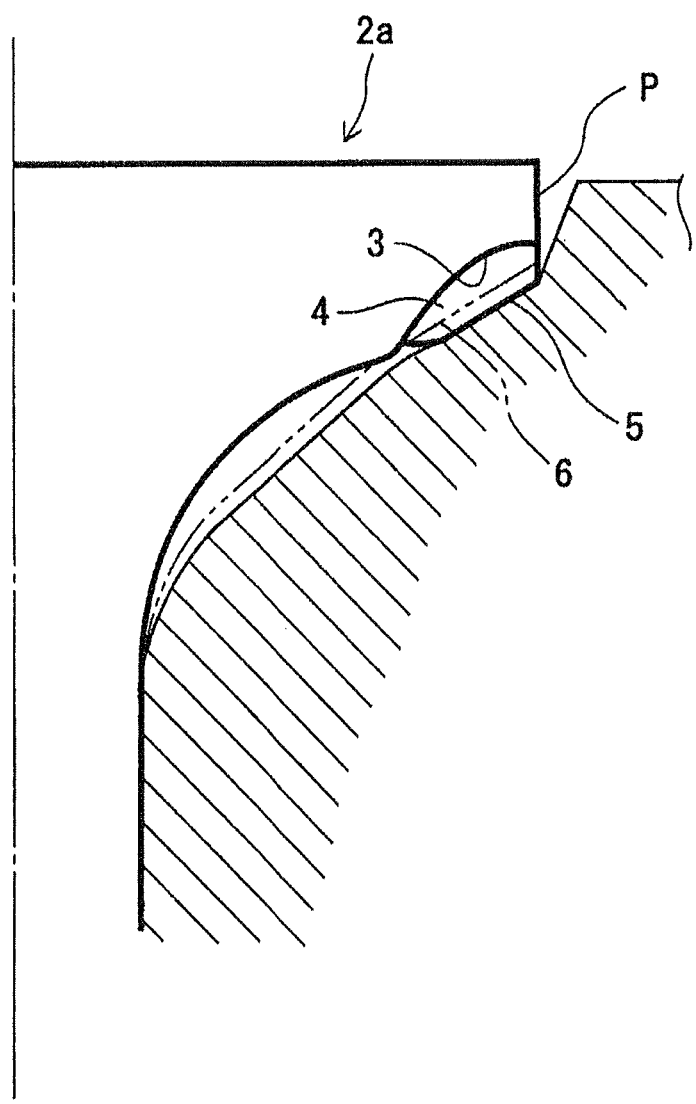
FIG. 2 is an enlarged sectional view of one example of the poppet valve at the time of second forging as shown in step 6 the of FIG. 1.

Step (5) ablating before forging as the fifth process is conducted as follows: FIG. 2 shows one example of the enlarged sectional view of the poppet valve after the ablating step. The surface part of the cladded part 4 is subjected to a cutting process to form a smooth surface 5 so that the contact pressure at the time of forging can be made uniform; and at the same time, the outer circumference P of the valve head 2*a* is cut to a predetermined dimension so that galling of the outer circumference can be prevented from occurring.

Herein, the smooth surface 5 corresponds to a mold, which is formed by cutting the cladded part 4, in order to make uniform the contact pressure at the second forging to avoid the potential situations described below. As the cobalt based alloy is hard and has low toughness, it is generally used for the welding material of the cladded part 4 which forms the smooth surface 5. There is a risk that cracking on the cladded part 4 occurs when the deformation volume or stress concentration is increased at the time of the second forging at a relatively low-temperature; and also, if the rough surface of the cladded part 4, after being cladded by welding, is subjected to being forged directly, there is a risk that the compressive residual stress and the work-hardening stage are not uniform.

At the sixth process i.e. Step (6) second forging, a valve seat surface 6 is formed by forging the smooth surface 5 of the cladded part 4 after preheating the valve head 2*a*. In this process, uniform contact pressure is applied to the smooth surface 5 at a temperature range possible for cold or warm forging of the smooth surface while being less than the recrystallization temperature of the base material of the valve body or cladding material, whichever is lower so as to form the valve seat surface 6.

In said second forging process, in order to prevent cracking on the welding border along the inner circumference of the cladded part 4 from occurring, the contact pressure is applied until it reaches said welding border. In addition, in order to prevent cracking on the valve seat surface 6, clearance is set at the outer circumference P of the valve head 2*a*, and the forging process is conducted such that the processing site is limited so that the outer circumference P of the valve head 2*a* is unconstrained. Further, in order to specify the volume of the pressing in a normal direction of the valve seat surface 6, a mold whose shape is different from the one for the primary forging is used.

At the seventh process i.e. Step (7) a completion process, a finished surface 7, which is capable of close contact with the valve seat in a cylinder head, is formed on the valve seat 2*b* to finish the poppet valve manufacturing. Said finished surface 7 is formed by cutting the pressed valve seat surface 6 along with some heat treating which is required.

The following concerns the internal stress of the poppet valve. According to the valve body 2 which is comprised of a valve stem 1*b* and the valve head 2*a*, its valve seat 2*b* having been formed through the respective process described above can be subjected to a second forging which is conducted by applying a uniform contact pressure onto the cladded part 4. In particular, the valve seat 2*b*, which is the inclined surface formed on the outer circumference of the valve head 2*a*, is provided with the groove 3. Subsequently the smooth surface 5 is formed by way of ablating the surface part of the cladded part 4.

By forming the valve seat surface 6 through the second forging process wherein the uniform contact pressure is applied, it becomes possible to apply uniform plastic deformation and to generate uniform compressive residual stress. After said compressive residual stress is applied to the valve seat 2*b* the tensile stress which is applied to the valve seat 2*b* when the poppet valve is used can be canceled out. This results in the enhancement of the fatigue strength and the characteristic of the valve seat surface-cracking resistance.

As described above, during the second forging, uniform contact pressure is applied under limited temperature conditions i.e at a temperature range possible for cold or warm forging of the smooth surface while being less than the recrystallization temperature of the base material of the valve body or the cladding material, whichever is lower. Therefore, with regard to the valve seat surface 6 as a whole, the compressive stress state can be maintained in the range located from the surface thereof to a predetermined depth without metal grain coarsening of both the base material of the valve body 2 and the valve seat 2*b*.

As a result, the compressive stress which is applied to the valve seat 2*b* retards the tensile stress resulting from the ablation of the valve seat surface 6 during either the finishing process or engine operation when tensile stress is created at the finished surface 7. Therefore, it becomes possible to enhance the resistance characteristics against a fatigue breaking caused by repeated stress while the engine is running or a seat-cracking caused by heat shock.

The following addresses the material strength of the poppet valve. With regard to common metal texture, the incidence of intra-granular dislocation is higher than grain boundary dislocation and the wider the grain boundary expands, the lower the incidence of dislocation becomes. That is to say, the larger the crystal grain becomes, the more frequently dislocation tends to occur as the grain boundary is narrowed accordingly, resulting in a decrease in strength. As described above, material strength is inversely related to the mobility of dislocation. The more the mobility of dislocation is increased, the more the strength is decreased.

In the process of the second forging, forging is conducted at a temperature in the warm forging range or the cold forging range of the smooth surface which is at the recrystallization temperature of the base material or cladding material whichever is lower or less so that the decrease in strength caused by grain coarsening can be prevented. Particularly, when the base material of the valve is austenite, it is difficult to conduct the following heat treatment for miniaturizing crystal grain while manufacturing the valve. Also, forging at the recrystallization temperature of the base material or cladding material whichever greater leads to grain coarsening which cannot be resolved back to the original strength even if an aging treatment is conducted. Thus, compared to hot forging, it is easier to harden the valve seat $2b$ so as to enhance its wear-resistance since the forging is conducted at temperature in the range which is less than the recrystallization temperature of the base material of the valve body or the cladding material, whichever is lower, so that the grain coarsening and the material strength decrease can be prevented.

For setting a specific forging temperature in the above-described case, the lower one out of the two temperatures i.e. the temperature less than the recrystallization temperature of the cladding material for welding or the temperature less than the recrystallization temperature of the base material should be chosen. It is common that a material which has the advantage of having a higher-temperature strength than the base material is used for the cladding material, which means the temperature less than the recrystallization temperature of the base material is lower in many cases. Accordingly, except for some exceptions, the temperature condition for the second forging is set to be less than the recrystallization temperature of the base material. However, the temperatures for the second forging will vary depending on the recrystallization temperature of the base material and cladding material used. The recrystallization temperature of the typical base material varies from 980 to 1,100° C. depending on the base material. The recrystallization temperature of the typical cladding material varies from 1,255 to 1,315° C. depending on the cladding material. The typical second forging temperature ranges from 830±50° C. to 985±50° C. depending on the base material and cladding material used.

One example of the valve forging is as follows: SUH3 is employed as the base material and wear-resistant cobalt based alloy (trade name: Stellite #6) is employed as the cladding material; the recrystallization temperature of SUH3 is around 980° C. to 1080° C., while that of Stellite #6 is around 1285° C. to 1395° C.; and as the recrystallization temperature of SUH3 is lower than that of the other one, it is reasonable to set the second forging temperature to 830±50° C. in consideration of the lower limit of the recrystallization of SUH3 and margin, so that the warm forging at the temperature less than the recrystallization temperature of SUH3 can be conducted. Another example of the valve forging is as follows: high nickel alloy (NCF80A) is employed as the base material and wear-resistant cobalt based alloy (trade name: Stellite #712) is employed as the cladding material; the recrystallization temperature of NCF80A is around 1000° C. to 1100° C., while that of Stellite #712 is around 1280° C. to 1315° C.; and as the recrystallization temperature of NCF80A is lower than that of the other one, it is reasonable to set the second forging temperature to 850±50° C. in consideration of the lower limit of the recrystallization of NCF80A and margin, so that the warm forging at the temperature less than the recrystallization temperature of NCF80A can be conducted.

Hereinafter describes the results regarding the residual stress, cracking and surface hardness of the valve seat $2b$ that is obtained by verifying the poppet valve manufactured through the respective process described above.

One example of stress distribution verifications is explained hereafter. At two points on the valve head $2a$ wherein the angular difference between them is 180-degrees, measurements of the residual stress in circumferential and radial directions at depth positions of 0, 20, 50 μm were conducted under the following conditions: the poppet valve which is formed such that the diameter of its valve head $2a$ is ϕ70 mm, the valve seat angle is 120-degrees and the second forging temperature T=850±50° C. is employed; its base material is the aforementioned high nickel alloy and the cladding material is the aforementioned wear-resistant cobalt based alloy; an X-ray residual stress measurement is employed as the measurement method; and said method is characterized in that the tube voltage is set at 40 kV, tube current is set at 30 mA, the characteristic X-ray is set at CrKα-ray, the collimator is set at ϕ2.0 mm, and the measurement mode is based on an Iso-inclination method. The following results were obtained.

Figure 4:
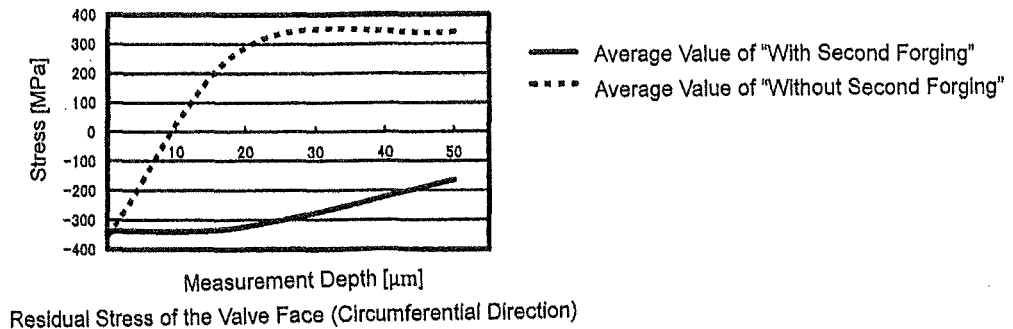
FIG. 4 is a distribution comparison chart of the residual stress (circumferential direction and radial direction).
Figure 4:
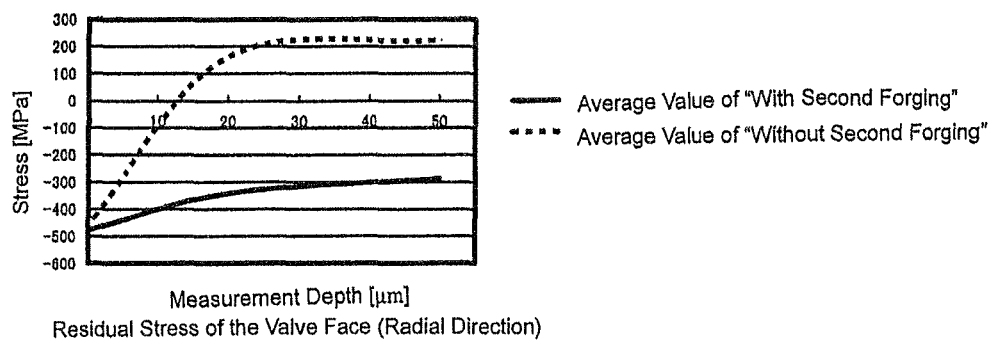

The comparison result of the residual stress of the valve seat $2b$ in terms of with or without the second forging is shown in the distribution comparison chart of the residual stress (circumferential/radial direction) of FIG. 4. At the surface, the respective compressive stresses are the same. On the other hand, at the depth of 20 and 50 μm, the valve seat "without second forging" shows tensile stress, and the valve seat "with second forging" shows compressive stress. From these results, it is concluded that the valve formed without the second forging has tensile stress everywhere except its surface or its shallow part but the valve formed with the second forging has compressive stress from its surface to its deep interior.

Further, with regard to the characteristic of the heat shock resistant of the valve seat $2b$, a heat shock test was conducted to verify the results comparing two cases i.e. with or without the second forging under the following conditions: the poppet valve which is formed such that the diameter of its valve head $2a$ is ϕ70 mm, the valve seat angle is 120-degrees and the second forging temperature T=850±50° C. is employed; its base material is the aforementioned high nickel alloy and the cladding material is the aforementioned wear-resistant cobalt based alloy; its test method is verifying whether seat-cracking has occurred or not by conducting a liquid penetrant examination on the surface of the valve under the test; and said examination is conducted by rapidly cooling the specimen valves (three valves for each condition), which were in the testing temperature, with cold water at a temperature in the range of 20±5° C. The following results were obtained.

Figure 5:
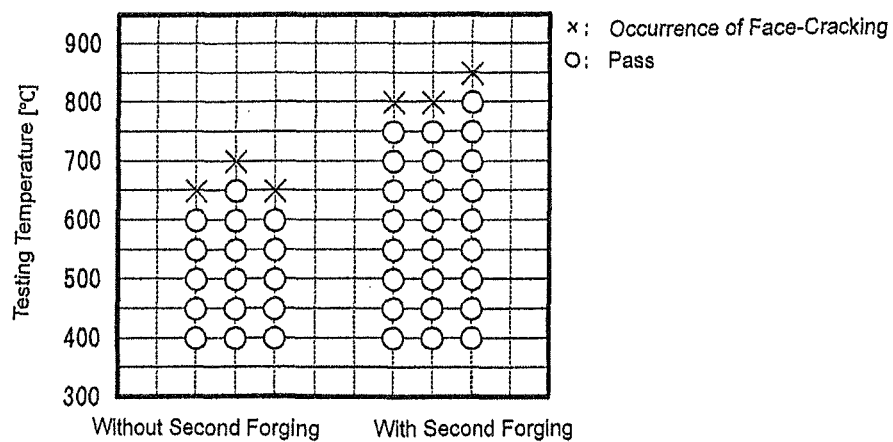
FIG. 5 is a comparison chart of results of heat shock testing.

The comparison result of the characteristic of the heat shock resistant of the valve seat $2b$ in terms of with or without the second forging is shown in the comparison chart of the result of the heat shock testing of FIG. 5. With regard to the valve seat $2b$ "without second forging", seat-cracking occurred at a temperature in the range from 650 to 700° C. On the other hand, with regard to the valve seat $2b$ "with second forging", seat-cracking occurred at temperature in the range from 800 to 850° C. Accordingly it is concluded that the second forging is advantageous for enhancing the characteristic of the heat shock resistant.

Furthermore, with regard to the internal defect of the valve seat $2b$, a microscopic observation of the metal texture was conducted to verify the results comparing two cases i.e. with or without the second forging under conditions as follows: the poppet valve which is formed such that the diameter of its valve head $2a$ is ϕ110 mm, the valve seat angle is 100-degrees and the second forging temperature T=850±50° C. is employed; its base material is the aforementioned high nickel alloy and the cladding material is the aforementioned wear-resistant cobalt based alloy; and cladding by welding is carried out such that the base material side is subjected to incur cracking. Although obvious cracking was seen on the valve formed without the second forging, no pinhole or cracking was seen on the valve formed with the second forging with regard to the base material side and the cladded part side of the valve seat thereof. From these results, it is reasonable to deduce that the cracking occurring on the base material side had been cured by applying pressure due to the second forging.

Figure 6:
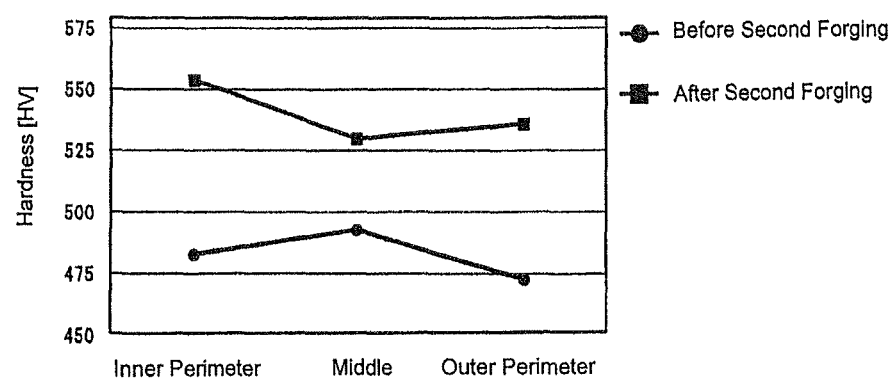
FIG. 6 is a comparison chart of hardness level of the valve seat.

Moreover, with regard to the work-hardening, the hardness level of the intended surface of the cladded part 4 when it was completed was measured at three points of the valve seat surface 6 i.e. its middle point, its inner side point and its outer side point and the results verified by comparing two cases i.e. before and after the second forging under conditions as follows: the poppet valve which is formed such that the diameter of its valve head 2a is φ110 mm, the valve seat angle is 100-degrees and the second forging temperature T=850±50° C. is employed; and its base material is the aforementioned high nickel alloy and the cladding material is the aforementioned wear-resistant cobalt based alloy. As shown in the comparison chart of FIG. 6, the hardness levels of the valve seats were compared. The measured hardness values of the post-second-forging were higher than those of the pre-second-forging in the range from 35 to 70 HV, which means that work-hardening was achieved after the second-forging.

Below is the summary of the verification results of the second forging described above.

At measurement depth positions of 0 μm, 20 μm and 50 μm, with respect to the valve formed without the second forging, tensile stress was seen at the depth of 20 μm and 50 μm and with respect to the valve formed with the second forging, compressive residual stress was seen at every depth position without regard to circumferential or radial direction.

As a result of the heat shock test, improvements of the characteristics of seat-cracking resistance and the strength enhancement against thermal stress were obtained.

With respect to the poppet valve whose internal texture of the base material incurs cracking due to cladding by welding, the fixing effect caused by the second forging was been seen through the microscopic analysis of the metal texture. In this analysis, the test object is the poppet valve which is formed such that the diameter of its valve head 2a is φ110 mm, the valve seat angle is 100-degrees, its base material is the high nickel alloy (NCF80A) and the cladding material is Stellite #712.

As for the hardness level of the intended surface part of the cladded part 4 when it is completed, values of post-second-forging are higher than those of pre-second-forging from 35 to 70 HV at three points i.e. the sides of inner perimeter, middle and outer circumference of the valve seat 2b. That is to say, work-hardening was observed.

As described above, it is concluded that the respective process in connection with the second forging which was conducted upon the valve seat 2b of the poppet valve was advantageous to ensure high durability by enhancing the characteristics of the cracking resistance and the wear-resistance, by utilizing the characteristics of the cladding material of the valve seat 2b. This is because, as shown in the verification results, the second forging has the advantageous effect not only on solving welding defects but also on obtaining compressive residual stress and work-hardening.

Figure 3:
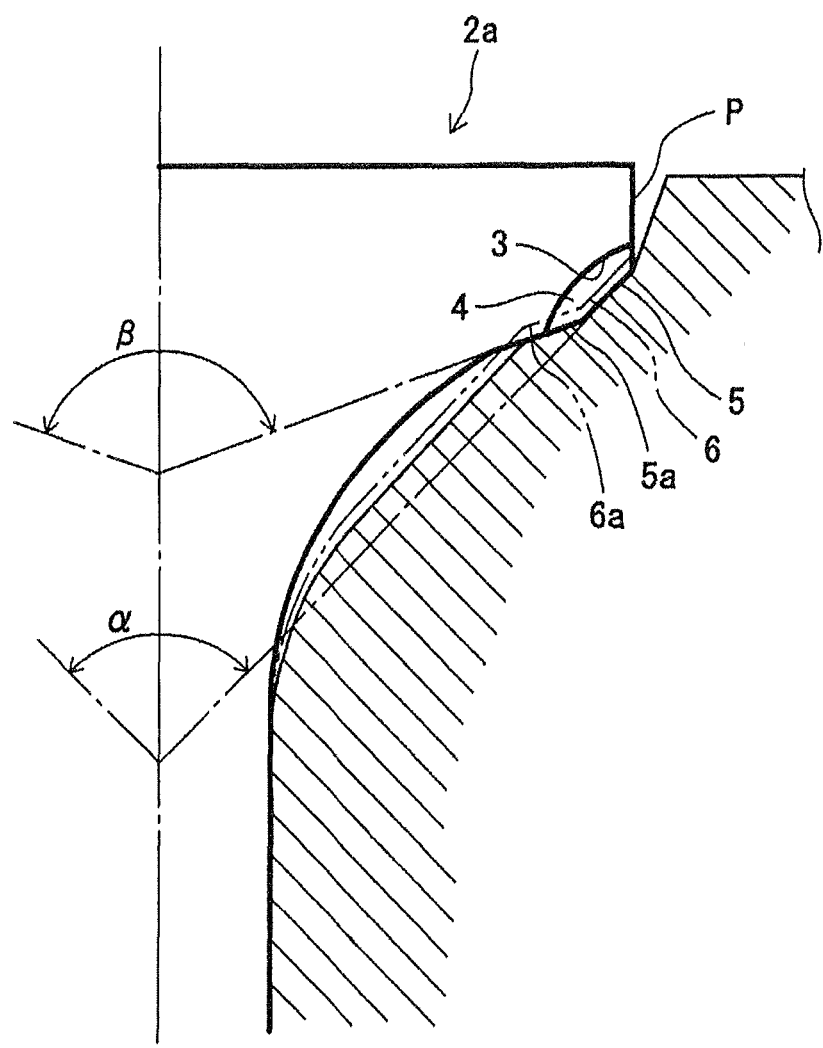
FIG. 3 is an enlarged sectional view of another example of the poppet valve at the time of second forging as shown in step 6 the of FIG. 1.

Next, as shown in the enlarged sectional view of the poppet valve at the time of the second forging in FIG. 3, the second forging where the aperture angle of the valve seat surface 6 is low is explained. At the fifth process out of the series of the aforementioned processes i.e. ablation before forging, a second smooth surface 5a is formed by way of the cutting process such that, in addition to the smooth surface 5 of the cladded part 4, the boundary part of the inner circumference thereof which is in a span of the base material of the valve head 2a is cut to be ablated. Said second smooth surface 5a is subjected to the second forging to form an enlarged valve seat surface 6a which is integrated with the valve seat surface 6 and expands towards the inner circumference thereof in the same manner wherein the valve seat surface 6 is formed on the cladded part 4. Herein, the enlarged valve seat surface 6a is formed such that the aperture angle β is larger than the aperture angle α of the valve seat surface 6. Since the aperture angle α is set to conform to the completed valve seat angle, commonly-used poppet valves are set such that the aperture angles are 30°≤α<180° and α<β≤180°.

Due to said processes wherein the valve seat surface 6 of the cladded part 4 is formed concurrently with the enlarged valve seat surface 6a which is integrally formed with the valve seat surface 6 in the region of the inner circumference thereof, the contact pressure applied on the valve seat surface 6 is reduced so that the cracking of the valve seat 2b can be prevented from occurring.

For example, when a poppet valve whose diameter of its valve head 2a is 100 mm and having a valve seat surface 6 formed at acute aperture angle of about 90-degree is subjected to the second forging, the aperture angle α of a mold is set to be 90-degrees and aperture angle β is set to be 140-degrees. Using said mold allows one to conduct a stable second forging. Accordingly, it becomes possible to form the valve seat 2b of the poppet valve which is work-hardened while at the same time maintaining the compressive residual stress from the valve seat surface 6 to the predetermined depth. As a result, resistance characteristics against a fatigue breaking caused by repeated stress while the engine is running or seat-cracking caused by heat shock can be enhanced. As the valve seat 2b is work-hardened, wear-resistance can be also enhanced.

The invention claimed is:

1. A method of forming a valve seat of a poppet valve comprised of a stem and a valve head formed at one end thereof, said method comprising:
   forming a rounded cladded part on the valve head by welding; and
   forming a valve seat surface having a predetermined aperture angle on the cladded part,
   wherein the outer circumference of the valve head is cut into a predetermined dimension, the surface of the cladded part is cut to form a smooth surface thereon, and said smooth surface is forged by applying a uniform contact pressure at a temperature range possible for cold or warm forging while being less than the recrystallization temperature.

2. A poppet valve comprised of a stem and a valve head formed at one end thereof,
   said valve head being provided with a rounded cladded part by welding so that a valve seat with a valve seat surface having a predetermined aperture angle is formed thereon, wherein
   the outer circumference of the valve head being cut into a predetermined dimension, and
   the surface of the cladded part being cut to form a smooth surface thereon to be forged by applying a uniform contact pressure at a temperature range possible for cold or warm forging while being less than the recrystallization temperature.

* * * * *